(12) United States Patent
Tang

(10) Patent No.: US 11,259,275 B2
(45) Date of Patent: Feb. 22, 2022

(54) COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/532,147

(22) Filed: Aug. 5, 2019

(65) Prior Publication Data

US 2019/0364542 A1 Nov. 28, 2019

Related U.S. Application Data

(63) Continuation of application No. PCT/CN2017/072989, filed on Feb. 6, 2017.

(51) Int. Cl.
*H04W 72/02* (2009.01)
*H04W 72/04* (2009.01)
*H04W 8/22* (2009.01)
*H04W 74/08* (2009.01)

(52) U.S. Cl.
CPC ............ *H04W 72/02* (2013.01); *H04W 8/22* (2013.01); *H04W 72/042* (2013.01); *H04W 72/046* (2013.01); *H04W 74/0833* (2013.01)

(58) Field of Classification Search
CPC ... H04W 72/02; H04W 74/0833; H04W 8/22; H04W 72/042; H04W 72/046

USPC ........................................................ 370/329
See application file for complete search history.

(56) References Cited

U.S. PATENT DOCUMENTS

| | | | |
|---|---|---|---|
| 10,028,304 B2 * | 7/2018 | Akkarakaran | ...... H04L 27/2608 |
| 2014/0153662 A1 | 6/2014 | Lin et al. | |
| 2016/0099763 A1 | 4/2016 | Chen | |
| 2016/0190707 A1 | 6/2016 | Park et al. | |

(Continued)

FOREIGN PATENT DOCUMENTS

| CN | 101355380 A | 1/2009 |
|---|---|---|
| CN | 103891161 A1 | 6/2014 |

(Continued)

OTHER PUBLICATIONS

International Search Report in international application No. PCT/CN20171072989, dated Oct. 18, 2017 with translation provided by Espacenet.

(Continued)

*Primary Examiner* — Faisal Choudhury
(74) *Attorney, Agent, or Firm* — Ladas & Parry, LLP

(57) ABSTRACT

Embodiments of the present disclosure provide a communication method, a terminal device and a network device. The method includes: a terminal device determines beam correspondence information, where the beam correspondence information indicates a beam correspondence between an uplink transmitting beam and a downlink receiving beam of the terminal device; and the terminal device transmits the beam correspondence information to a network device. The communication method according to embodiments of the present disclosure can alleviate the burden on devices.

13 Claims, 3 Drawing Sheets

200

(56) References Cited

U.S. PATENT DOCUMENTS

| | | | |
|---|---|---|---|
| 2016/0285583 A1 | 9/2016 | Kasher et al. | |
| 2019/0044756 A1* | 2/2019 | Zhao | H04L 25/0204 |
| 2019/0089420 A1* | 3/2019 | Koskela | H04B 7/0417 |
| 2019/0199496 A1* | 6/2019 | Qin | H04W 72/04 |
| 2020/0136708 A1* | 4/2020 | Pan | H04L 5/0051 |
| 2020/0145079 A1* | 5/2020 | Marinier | H04B 7/0456 |

FOREIGN PATENT DOCUMENTS

| | | | |
|---|---|---|---|
| CN | 104734761 | A | 6/2015 |
| CN | 105308881 | A | 2/2016 |
| CN | 106031051 | A | 10/2016 |
| CN | 106374984 | A | 2/2017 |
| EP | 2870703 | A1 | 5/2015 |
| EP | 3520237 | A1 | 8/2019 |
| EP | 3523886 | A1 | 8/2019 |
| JP | 2011130438 | A | 6/2011 |
| JP | 2019534615 | A | 11/2019 |
| RU | 2603969 | C2 | 12/2016 |
| WO | 2015090034 | A1 | 6/2015 |
| WO | 2016141975 | A1 | 9/2016 |
| WO | 2016148795 | A1 | 9/2016 |
| WO | 2018064372 | A1 | 4/2018 |
| WO | 20188067306 | A1 | 4/2018 |
| WO | 2018144844 | A1 | 8/2018 |
| WO | 2018141111 | A1 | 9/2018 |

OTHER PUBLICATIONS

Written Opinion of the International Search Authority in international application No. PCT/CN20171072989, dated Oct. 18, 2017 with translation provided by Google translate.

NTT DOCOMO Samsung Mitsubishi Electric Mediatek Sharp Oppo MTI: "WF on Beam Correspondence", R1-1701351_WF on Beam Correspondence_V6 (3GPP); Mobile Competence Centre; 650, Rouye Des Lucioles; F-06921 Sophia-Antipolis Cedex; France; vol. RAN WG1, No. Spokane, USA Jan. 19, 2017 (Jan. 19, 2017), XP051222345.

Vivo; "Discussion on beam management for NR MIMO", R1-1700274_ Discussion on Beam Management for NR MIMO (3GPP); Mobile Competence Centre; 650, Route Des Lucioles; F-06921 Sophia-Antipolis Cedex; France; vol. RAN WG1, No. Spokane, USA; Jan. 16, 2017-Jan. 20, 2017 Jan. 16, 2017 (Jan. 16, 2017), XP051207812.

The Extended European Search Report dated Nov. 13, 2019; Appln. No. 17895210.7.

The First Office Action of corresponding Chinese application No. 201780085809.0, dated Mar. 13, 2020.

3GPP TSG RAN WG1 #87, R1-1613602; Calibration Support for Beam Correspondence, Reno, Nevada, USA, Nov. 14-18, 2016.

3GPP TSG RAN WG1 Meeting #87, WF on Beam Correspondence, Reno, USA, Nov. 14-18, 2016.

The third Office Action of corresponding Chinese application No. 201780085809.0, dated Sep. 2, 2020.

The First Office Action of corresponding Chilean application No. 201902199, dated Sep. 30, 2020.

The Second Office Action of corresponding Chinese application No. 201780085809.0, dated Jun. 3, 2020.

The first Office Action of corresponding Russian application No. 2019127881, dated Jun. 11, 2020.

The first Office Action of corresponding European application No. 17895210.7, dated Jul. 6, 2020.

The first Office Action of corresponding Indian application No. 201917034648, dated Oct. 13, 2020.

The first Office Action of corresponding Canadian application No. 3052733, dated Nov. 27, 2020.

The Notice of Allowance of corresponding Chinese application No. 201780085809.0, dated Dec. 15, 2020.

Huawei, HiSilicon, R1-166089, 3GPP TSG RAN WG1 Meeting #86, Beam Management Procedure for NR MIMO, published on Aug. 26, 2016.

Fengrui, Yang et al. LTE/LTE-Advanced system architecture and key technologies, published on Feb. 28, 2015.

The second Office Action of corresponding European application No. 17895210.7, dated Jan. 18, 2021.

LG Electronics: "Discussion on UL-MIMO", 3GPP Draft; R1-1700467 NR_UL-MIMO_Final, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017 Jan. 16, 2017 (Jan. 16, 2017), XP051208000.

The First Office Action of corresponding Japanese application No. 2019-542590, dated Feb. 2, 2021.

Samsung, UL beam management RS [online], 3GPP TSG RAN WG1 #87 R1-1612496, Nov. 4, 2016, Internet<URL:http://www.3gpp.org/ftp/tsg_ran/WG1_RL1/TSGR1_87/Docs/R1-1612496.zip>.

Lenovo, Consideration on the resource configuration of PRACH for UEs with/without TX/RX reciprocity[online], 3GPP TSG RAN WG1 adhoc_NR_AH_1701 R1-1700561, Jan. 9, 2017, Internet<URL:http://www.3gpp.org/ftp/tsg_ran/WG1_RL1/TSGR1_AH/NR_AH_1701/Docs/R1-1700561.zip>.

Nokia, Alcatel-Lucent Shanghai Bell, Beam Measurements and TX/RX Beam Correspondence [online], 3GPP TSG RAN WG1 adhoc_NR_AH_1701 R1-1701090, Internet<URL:http://www.3gpp.org/ftp/tsg_ran/WG1_RL1/TSGR1_AH/NR_AH_1701/Docs/R1-1701090.zip>, Jan. 9, 2017, Internet<URL:http://www.3gpp.org/ftp/tsg_ran/WG1_RL1/TSGR1_AH/NR_AH_1701/Docs/R1-1701090.zip>.

The second Office Action of corresponding Chilean application No. 201902199, dated Mar. 24, 2021.

The Notice of Allowance of corresponding Japanese application No. 2019-542590, dated Apr. 16, 2021.

The third Office Action of corresponding European application No. 17895210.7, dated Jul. 7, 2021.

The second Office Action of corresponding Canadian application No. 3052733, dated Jul. 20, 2021.

The first Office Action of corresponding Israeli application No. 268533, dated Aug. 15, 2021.

The first Office Action of corresponding Taiwan application No. 107103258, dated Oct. 5, 2021.

The first Office Action of corresponding Australia application No. 2017397501, dated Oct. 21, 2021.

* cited by examiner

200

A terminal device determines beam correspondence information, where the beam correspondence information indicates a beam correspondence between an uplink transmitting beam and a downlink receiving beam of the terminal device — S210

The terminal device transmits the beam correspondence information to a network device — S220

COMMUNICATION METHOD, TERMINAL DEVICE, AND NETWORK DEVICE

CROSS-REFERENCE TO RELATED APPLICATIONS

This application is a continuation application of the International Application No. PCT/CN2017/072989, filed on Feb. 6, 2017, entitled "COMMUNICATION METHOD, TERMINAL DEVICE, AND NETWORK DEVICE", the content of which is incorporated herein by reference in its entirety.

TECHNICAL FIELD

Embodiments of the present disclosure relates to the field of communications, and more particularly, to a communication method, a terminal device, and a network device.

BACKGROUND

In a multi-beam system, a terminal device and a network device can train multiple beams through beamforming, while different beams can correspond to different directions and different coverage areas. Specifically, the terminal device may have multiple uplink transmitting beams and multiple downlink receiving beams, and the network device may have multiple uplink receive beams and multiple downlink transmit beams. Therefore, it is necessary for the terminal device to select a beam for data transmission in the uplink direction and in the downlink direction, resulting in heavy burden on the device. Therefore, a method to alleviate the burden on devices is desired.

SUMMARY

Embodiments of the present disclosure provide a communication method, a terminal device, and a network device, which can alleviate the burden on devices.

In a first aspect, a communication method is provided, including:

determining, by a terminal device, beam correspondence information, where the beam correspondence information indicates a beam correspondence between an uplink transmitting beam and a downlink receiving beam of the terminal device;

transmitting, by the terminal device, the beam correspondence information to a network device.

In conjunction with the first aspect, in some implementation manners of the first aspect, the beam correspondence is one of a plurality of beam correspondence, and the plurality of beam correspondence include that beam correspondence holds and beam correspondence does not hold.

In an embodiment, the beam correspondence information indicates whether the uplink transmitting beam and the downlink receiving beam at the terminal device have a corresponding relationship. If there is a corresponding relationship, it is considered that the beam correspondence at the terminal device holds. Otherwise, the beam correspondence at the terminal device does not hold. That is, the plurality of beam correspondence may include two types of beam correspondence where the beam correspondence at the terminal device holds and the beam correspondence at the terminal device does not hold. The terminal device may transmit the beam correspondence information to the network device, so that the network device configures a corresponding training beam for the uplink and downlink directions for the terminal device according to the beam correspondence of the terminal device. In an embodiment, if the beam correspondence of the terminal device holds, the network device can configure only one training beam in the link direction, and beam for transmission in the another link direction can be determined according to the correspondence between the uplink transmitting beam and the downlink receiving beam.

In conjunction with the first aspect, in some implementations of the first aspect, the transmitting, by the terminal device, the beam correspondence information to a network device includes: transmitting, by the terminal device, a first message to the network device, where the first message includes the beam correspondence information, and the first message is a message in which the terminal device transmits a random access preamble signal to the network device in a random access procedure.

That is, the terminal device can transmit the beam correspondence information through the Msg1 in the random access procedure.

In conjunction with the first aspect, in some implementation manners of the first aspect, the method further includes: receiving, by the terminal device, a plurality of configuration information transmitted by the network device, where the plurality of configuration information corresponds to configuration information that is used by the terminal device to transmit a random access signal in the plurality of beam correspondence respectively, where each configuration information includes at least one of the following: information of a time domain resource for random access, information of a frequency domain resource for random access, or information of a preamble sequence for random access; the transmitting, by the terminal device, the beam correspondence information to a network device, includes: transmitting, by the terminal device, the random access signal by using configuration information corresponding to the beam correspondence.

In conjunction with the first aspect, in some implementation manners of the first aspect, the plurality of configuration information include first configuration information and second configuration information, where the first configuration information and the second configuration information correspond to configuration information that is used by the terminal device to transmit the random access signal in a beam correspondence that beam correspondence holds and a beam correspondence that beam correspondence does not hold respectively, where the transmitting, by the terminal device, the beam correspondence information to a network device, includes: transmitting, by the terminal device, the random access signal using at least one of information of a time domain resource for random access, information of a frequency domain resource for random access, or information of a preamble sequence for random access included in the first configuration information if the beam correspondence information indicates that beam correspondence at the terminal device holds; or transmitting, by the terminal device, the random access signal using at least one of information of a time domain resource for random access, information of a frequency domain resource for random access, or information of a preamble sequence for random access included in the second configuration information if the beam correspondence information indicates that beam correspondence at the terminal device does not hold.

Therefore, the network device may determine the beam correspondence at the terminal device according to the beam correspondence information included in the first message, or determine the beam correspondence at the terminal device according to the resource used by the terminal device to transmit the random access signal.

In conjunction with the first aspect, in some implementation manners of the first aspect, the transmitting, by the terminal device, the beam correspondence information to a network device includes: transmitting, by the terminal device, a second message to the network device, where the second message includes the beam correspondence information, and the second message is a message in which the terminal device transmits a terminal device identifier to the network device in a random access procedure.

That is to say, the terminal device can transmit the beam correspondence information through the Msg3 message in the random access procedure.

In an embodiment, the terminal device may transmit the beam correspondence information through an Msg1 message, or may transmit the beam correspondence information through an Msg3 message, or may also transmit the beam correspondence information through both an Msg1 message and an Msg3 message.

In conjunction with the first aspect, in some implementations of the first aspect, the transmitting, by the terminal device, the beam correspondence information to a network device includes: transmitting, by the terminal device, a radio resource control (RRC) signaling to the network device, where the RRC signaling includes the beam correspondence information.

In conjunction with the first aspect, in some implementations of the first aspect, the beam correspondence information is included in RRC signaling that is used to report capability information of the terminal device.

In an embodiment, the RRC signaling may include a capability information indication domain and a beam correspondence information indication domain, where the capability information indication domain is used to indicate capability information of the terminal device, and the beam correspondence information indication domain is used to indicate beam correspondence information at the terminal device.

In conjunction with the first aspect, in some implementations of the first aspect, the transmitting, by the terminal device, the beam correspondence information to a network device includes:

transmitting, by the terminal device, a media access control (MAC) control element (CE) to the network device, where the MAC CE includes the beam correspondence information.

In conjunction with the first aspect, in some implementations of the first aspect, the RRC signaling or the MAC CE further includes at least one of information of the uplink transmitting beam or information of an uplink transmitting beam group of the terminal device.

In an embodiment, the terminal device may transmit the beam correspondence information by using at least one of an Msg1 message, an Msg3 message, an RRC signaling, or a MAC CE. For example, the terminal device may transmit the beam correspondence information by using an Msg1 message and an Msg3 message. Or, the beam correspondence information may be transmitted through an Msg1 and an RRC signaling, or the beam correspondence information may be transmitted through an Msg3 and an RRC signaling, or the beam correspondence information may be transmitted through an Msg1 message, an MAC CE, and an RRC signaling, or the beam correspondence information is transmitted through an Msg1 message, an Msg3 message, an RRC signaling, and an MAC CE.

In conjunction with the first aspect, in some implementations of the first aspect, the information of the uplink transmitting beam includes a number of the uplink transmitting beam, and the information of the uplink transmitting beam group includes at least one of a number of the uplink transmitting beam group, a number of uplink transmitting beam included in each uplink transmitting beam group in the uplink transmitting beam group or a total number of uplink transmitting beams included in the uplink transmitting beam group.

In conjunction with the first aspect, in some implementations of the first aspect, the determining, by a terminal device, beam correspondence information includes: determining, by the terminal device, that the beam correspondence information indicates that beam correspondence at the terminal device holds if at least one of the following conditions is satisfied: the terminal device is capable of determining the uplink transmitting beam for uplink transmission based on a measurement by the terminal device on at least one downlink receiving beam; or the terminal device is capable of determining the downlink receiving beam for downlink transmission based on an indication from the network device, where the indication from the network device is obtained through a measurement by the network device on at least one uplink transmitting beam of the terminal device.

A second aspect provides a communication method, including: receiving, by a network device, beam correspondence information transmitted by a terminal device, where the beam correspondence information indicates a beam correspondence between an uplink transmitting beam and a downlink receiving beam of the terminal device; determining, according to the beam correspondence information, a beam correspondence at the terminal device In conjunction with the second aspect, in some implementations of the second aspect, the beam correspondence is one of a plurality of beam correspondence, and the plurality of beam correspondence include that beam correspondence holds and beam correspondence does not hold.

In conjunction with the second aspect, in some implementations of the second aspect, the receiving, by a network device, beam correspondence information transmitted by a terminal device includes: receiving, by the network device, a first message transmitted by the terminal device, where the first message includes the beam correspondence information, and the first message is a message in which the terminal device transmits a random access preamble signal to the network device in a random access procedure.

In conjunction with the second aspect, in some implementations of the second aspect, the method further includes: transmitting, by the network device, a plurality of configuration information to the terminal device, where the plurality of configuration information correspond to configuration information that is used by the terminal device to transmit a random access signal in a plurality of beam correspondence respectively, where each configuration information includes at least one of the following: information of a time domain resource for random access, information of a frequency domain resource for random access, or information of a preamble sequence for random access; the receiving, by a network device, beam correspondence information transmitted by a terminal device includes: receiving, by the network device, the random access signal that is transmitted by the terminal device by using configuration information corresponding to the beam correspondence; the determining, according to the beam correspondence information, a beam correspondence at the terminal device includes: determining, by the network device, a corresponding beam correspondence according to configuration information used by the received random access signal.

In conjunction with the second aspect, in some implementations of the second aspect, the plurality of configuration information include first configuration information and second configuration information, where the first configuration information and the second configuration information correspond to configuration information that is used by the terminal device to transmit the random access signal in a beam correspondence that beam correspondence holds and a beam correspondence that beam correspondence does not hold respectively, where determining, according to the beam correspondence information, a beam correspondence at the terminal device, includes: determining, by the network device, that the beam correspondence at the terminal device holds if the network device receives the random access signal that is transmitted by the terminal device using at least one of information of a time domain resource for random access, information of a frequency domain resource for random access or information of a preamble sequence for random access included in the first configuration information; or determining, by the network device, that the beam correspondence at the terminal device does not hold if the network device receives the random access signal that is transmitted by the terminal device using at least one of information of a time domain resource for random access, information of a frequency domain resource for random access or information of a preamble sequence for random access included in the second configuration information.

In conjunction with the second aspect, in some implementations of the second aspect, the receiving, by a network device, beam correspondence information transmitted by a terminal device includes: receiving, by the network device, a second message transmitted by the terminal device, where the second message includes the beam correspondence information, and the second message is a message in which the terminal device transmits a terminal device identifier to the network device in a random access procedure.

In conjunction with the second aspect, in some implementations of the second aspect, the receiving, by a network device, beam correspondence information transmitted by a terminal device includes: receiving, by the network device, a radio resource control (RRC) signaling transmitted by the terminal device, where the RRC signaling includes the beam correspondence information.

In conjunction with the second aspect, in some implementations of the second aspect, the beam correspondence information is carried in an RRC signaling that is used to report capability information of the terminal device.

In conjunction with the second aspect, in some implementations of the second aspect, the receiving, by a network device, beam correspondence information transmitted by a terminal device includes: receiving, by the network device, a media access control (MAC) control element (CE) transmitted by the terminal device, where the MAC CE includes the beam correspondence information.

In conjunction with the second aspect, in some implementations of the second aspect, the RRC signaling or the MAC CE further includes at least one of information of the uplink transmitting beam or information of an uplink transmitting beam group of the terminal device.

In conjunction with the second aspect, in some implementations of the second aspect, the information of the uplink transmitting beam includes a number of the uplink transmitting beam, and the information of the uplink transmitting beam group includes at least one of a number of the uplink transmitting beam group, a number of uplink transmitting beam included in each uplink transmitting beam group in the uplink transmitting beam group or a total number of uplink transmitting beams included in the uplink transmitting beam group.

In a third aspect, a terminal device is provided, including means for performing the method of the first aspect or various implementations thereof.

In a fourth aspect, a network device is provided, including means for performing the method of the second aspect or various implementations thereof.

In a fifth aspect, a terminal device is provided, including a memory, a processor, and a transceiver, where the memory is configured to store a program, the processor is configured to execute the program, and when the program is executed, the processor implements the method of the first aspect based on the transceiver.

In a sixth aspect, a network device is provided, including a memory, a processor, and a transceiver, where the memory is configured to store a program, the processor is configured to execute the program, and when the program is executed, the processor implements the method of the second aspect based on the transceiver.

In a seventh aspect, a computer readable medium is provided, where the computer readable medium stores program codes for execution by a terminal device, the program code includes instructions for implementing the method of the first aspect.

In an eighth aspect, a computer readable medium is provided, where the computer readable medium stores program codes for execution by a network device, the program code includes instructions for implementing the method of the second aspect.

DETAILED DESCRIPTION OF THE EMBODIMENTS

Technical solutions in embodiments of the present disclosure are described below with reference to the accompanying drawings of the embodiments of the present disclosure.

The technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system, a future evolved public land mobile network (PLMN) or a 5G system in future, etc.

Figures 1, 2:
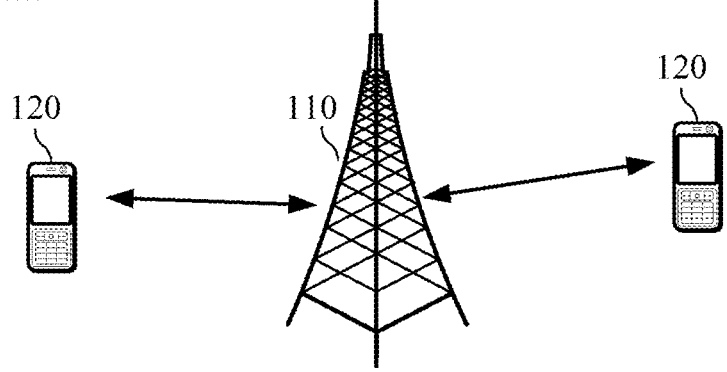
FIG. 1 is a schematic diagram of a communication system according to an embodiment of the present disclosure.
FIG. 2 is a schematic flow chart of a communication method according to an embodiment of the present disclosure.

FIG. 1 shows a wireless communication system 100 to which an embodiment of the present disclosure is applied. The wireless communication system 100 may include at least one network device 110. The network device 110 may be a device that communicates with a terminal device. Each network device 110 can provide communication coverage for a specific geographic area and can communicate with a terminal device located within the coverage area. The network device 110 may be a base transceiver station (BTS) in a GSM system or a CDMA system, or may be a nodeB (NB) in a WCDMA system, or may be an Evolutional Node B (eNB or eNodeB) in an LTE system, or may be a wireless controller in a cloud radio access network (CRAN), or a relay station, an access point, an in-vehicle device, a wearable device, a network side device, a transmission point in a future 5G network, or a network device in a future evolved PLMN and the like.

The wireless communication system 100 further includes a plurality of terminal device 120 located in the coverage range of the network device 110. The terminal device 120 may be mobile or fixed. The terminal device 120 may refer to an access terminal, a user equipment (UE), a user unit, a user station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with a wireless communication capability, a computing device with a wireless communication capability or other processing device connected to a wireless modem, an in-vehicle device, a wearable device, a terminal device in a future 5G network, or a terminal device in a future evolved PLMN etc.

FIG. 1 exemplarily shows one network device and two terminal devices. Alternatively, the wireless communication system 100 may include a plurality of network devices and may include other numbers of terminal devices within the coverage of each network device, which is not limited in the embodiment of the present disclosure.

In an embodiment, the wireless communication system 100 may further include other network entities, such as a network controller, a mobility management entity, and the like, and the embodiment of the present disclosure is not limited thereto.

The wireless communication system 100 may employ multiple beam techniques. Specifically, for the downlink, the network device may have multiple downlink transmit beams (DL Tx Beam), while the terminal device may have multiple downlink receiving beams (DL Rx Beam); for the uplink, the terminal device may have multiple uplinks transmit beam (UL Tx Beam), while the network device may have multiple uplink receive beams (UL Rx Beam).

To facilitate the understanding, it is assumed here that the terminal device has U1 uplink transmitting beams and D1 downlink receiving beams, and the network device has U2 uplink receive beams and D2 downlink transmit beams, where U1, U2, D1 and D2 are all integers greater than 1.

In a process of communication, it is necessary for the network device and the terminal device to determine the beam currently used for downlink transmission and the beam currently used for uplink transmission respectively, thereby causing large signaling overhead and heavy burden on the devices.

Specifically, for selecting a beam for downlink transmission, the network device needs to transmit D1 downlink signals to the terminal device by using each of the downlink transmission beams. The terminal device can measure the D1 downlink signals transmitted by the network device with the same downlink transmit beam by using D1 downlink receiving beams, and then obtain D1 measurement values. In this way, the terminal device needs to perform D1×D2 measurements, obtain D1×D2 measurement values, and determine the downlink transmit beam and downlink receiving beam that are currently used from all downlink transmit beams and downlink receiving beams according to an obtained set of measurement values.

Similarly, for selecting a beam for uplink transmission, the terminal device needs to transmit an uplink signal to the network device using each of the uplink transmitting beams. The network device needs to perform measurement on each uplink transmitting beam of the terminal device by using each uplink receive beam in all uplink receive beams, obtain multiple measurement values, and determine the uplink transmitting beam and uplink receive beam that are currently used from multiple downlink transmit beams and downlink receiving beams according to an obtained set of measurement values.

However, if beam correspondence at the terminal device holds, that is, an uplink transmitting beam and a downlink receiving beam of the terminal device have a corresponding relationship, and thus the downlink receiving beam can be determined according to the uplink transmitting beam of the terminal device, or the uplink transmitting beam can be determined according to the downlink receiving beam. In this way, the terminal device only needs to perform beam selection in one link direction to obtain a beam for data transmission in another link direction, thereby alleviating the burden on the device.

FIG. 2 is a schematic flowchart of a communication method 200 according to an embodiment of the present disclosure. As shown in FIG. 2, the method 200 includes:

S210, A terminal device determines beam correspondence information, where the beam correspondence information indicates a beam correspondence between an uplink transmitting beam and a downlink receiving beam of the terminal device.

In an embodiment, the beam correspondence is one of a plurality of beam correspondence, and the plurality of beam correspondence include that beam correspondence holds and beam correspondence does not hold.

Specifically, the terminal device may include multiple beam correspondence, where the beam correspondence information may indicate a specific beam correspondence between an uplink transmitting beam and a downlink receiving beam of the terminal device. The multiple beam correspondence may include two types of beam correspondence, and the two types of beam correspondence may be that the uplink transmitting beam and the downlink receiving beam of the terminal device have a corresponding relationship or have no corresponding relationship. If the uplink transmitting beam and the downlink receiving beam of the terminal device have a corresponding relationship, it can be considered that the beam correspondence at the terminal device holds; otherwise, the beam correspondence at the terminal device does not hold.

It should be understood that the corresponding relationship between the uplink transmitting beam and the downlink receiving beam of the terminal device may be one-to-one, that is, one uplink transmitting beam corresponds to one downlink receiving beam; or one-to-multiple, for example, one uplink transmitting beam corresponds to multiple downlink receiving beams, or multiple uplink transmitting beams correspond to one downlink receiving beam; or may be multiple-to-multiple, for example, multiple uplink transmitting beams correspond to multiple downlink receiving beams.

As an embodiment, the terminal device determines that the beam correspondence information indicates that the beam correspondence at the terminal device holds if at least one of the following conditions is satisfied:

the terminal device is capable of determining an uplink transmitting beam for uplink transmission based on a measurement by the terminal device on at least one downlink receiving beam; or the terminal device is capable of determining the downlink receiving beam for downlink transmission based on an indication from the network device, where the indication from the network device is obtained through a measurement by the network device on at least one uplink transmitting beam of the terminal device.

That is, if at least one of the following conditions is satisfied, the terminal device determines that the beam correspondence at the terminal device holds:

1. The terminal device is capable of determining a UL Tx beam for uplink transmission based on the measurement by the terminal device on one or more DL Rx beams;

2. The terminal device is capable of determining a DL Rx beam for downlink transmission based on an indication of the network device, where the indication of the network device is based on a measurement on one or more UL Tx beams of the terminal device.

S220, The terminal device transmits the beam correspondence information to the network device.

Specifically, after the terminal device determines the beam correspondence information at the terminal device, the terminal device transmits the beam correspondence information to the network device. In an embodiment, the terminal device may transmit the beam correspondence information to the network device during a random access procedure, or transmit the beam correspondence information to the network device after the random access succeeds, or may transmit the beam correspondence information to the network device both during the random access procedure and after the random access succeeds. The beam correspondence information reported by the terminal device to the terminal device may be based on an indication from the network device or may be specified by a protocol.

In an embodiment, the S220 may further include:

The terminal device transmits a first message to the network device, where the first message includes the beam correspondence information, and the first message is a message in which the terminal device transmits a random access preamble signal to the network device in a random access procedure.

Specifically, the terminal device may transmit a first message to the network device, where the first message includes the beam correspondence information, and the first message is a message in which the terminal device transmits a random access preamble signal to the network device in a random access procedure. In other words, the first message may be an Msg1 message in a random access procedure. That is to say, the terminal device may transmit an Msg1 to the network device, where the beam correspondence information is carried in the Msg1, and inform the network device of the beam correspondence information of the terminal device via the Msg1.

In an embodiment, the method 200 may further include:

the terminal device receives a plurality of configuration information transmitted by the network device, where the plurality of configuration information correspond to configuration information that is used by the terminal device to transmit a random access signal in the plurality of beam correspondence respectively, where each configuration information includes at least one of the following:

information of a time domain resource for random access, information of a frequency domain resource for random access, or information of a preamble sequence for random access.

In this case, the S210 may further includes:

the terminal device transmits the random access signal by using configuration information corresponding to the beam correspondence.

Specifically, the network device may transmit a plurality of configuration information to the terminal device, where each of the plurality of configuration information may indicate at least one of information of a time domain resources for random access, information of a frequency domain resource for random access, or information of a preamble sequence for random access. The plurality of configuration information correspond to configuration information that is used by the terminal device to transmit a random access signal (for example, Msg1 or Msg3) in the plurality of beam correspondence respectively. That is, the terminal device can use a corresponding configuration message to transmit a random access signal in different beam correspondence. Therefore, the network device may further determine, according to at least one of a time domain resource, a frequency domain resource, or the preamble sequence used by the terminal device to transmit the random access signal, which configuration information of the plurality of configuration information is used by the terminal device, and then determine a corresponding beam correspondence according to the configuration information that is used. That is, the network device can determine the beam correspondence of the terminal device according to a resource that the terminal device uses for uplink transmission.

In an embodiment, the plurality of configuration information include first configuration information and second configuration information, where the first configuration information and the second configuration information correspond to configuration information that is used by the terminal device to transmit the random access signal in a beam correspondence that beam correspondence holds and a beam correspondence that beam correspondence does not hold respectively, where the terminal device transmits the beam correspondence information to a network device, includes:

the terminal device transmits the random access signal using at least one of information of a time domain resource for random access, information of a frequency domain resource for random access, or information of a preamble sequence for random access included in the first configuration information if the beam correspondence information indicates that beam correspondence at the terminal device holds; or the terminal device transmits the random access signal using at least one of information of a time domain resource for random access, information of a frequency domain resource for random access, or information of a preamble sequence for random access included in the second configuration information if the beam correspondence information indicates that beam correspondence at the terminal device does not hold.

Specifically, if the plurality of beam correspondence include situations that beam correspondence holds and beam correspondence does not hold, the plurality of configuration information may include two configuration information, which are denoted as first configuration information and second configuration information. The first configuration information and the second configuration information correspond to configuration information that is used by the terminal device to transmit the random access signal in a beam correspondence that beam correspondence holds and a beam correspondence that beam correspondence does not hold respectively, that is, the first configuration information and the second configuration information indicate a resource used by the terminal device to transmit the random access signal in two beam correspondence respectively. Specifically, if the beam correspondence information indicates that the beam correspondence at the terminal device holds, the terminal device transmits a random access signal using the first configuration information corresponding to the case where the beam correspondence holds; or if the beam correspondence information indicates that the beam correspondence at the terminal device does not hold, the terminal device transmits a random access signal using the second configuration information corresponding to the case where the beam correspondence does not hold. Therefore, the network device may also determine whether the beam correspondence of the terminal device holds according to the resource that is used by the terminal device to transmit the random access signal. That is, the network device may determine the beam correspondence at the terminal device according to the beam correspondence information included in the first message, or determine the beam correspondence at the terminal device according to the resource used by the terminal device to transmit the random access signal.

In an embodiment, N downlink transmit beam groups of the network device may correspond to N sets of configuration information, where N is an integer greater than zero, and each set of configuration information may include two parts, which are respectively corresponding to a situation that beam correspondence holds and a situation that beam correspondence does not hold. Each configuration information group indicates a resource and/or a preamble sequence used by an uplink random access signal corresponding to a corresponding downlink transmit beam group.

In an embodiment, the S220 may further include:

The terminal device transmits a second message to the network device, where the second message includes the beam correspondence information, and the second message is a message in which the terminal device transmits a terminal device identifier to the network device in a random access procedure.

Specifically, the terminal device may transmit a second message to the network device, where the second message includes the beam correspondence information, and the second message is a message in which the terminal device transmits a terminal device identifier to the network device in a random access procedure. In other words, the second message may be an Msg3 message in a random access procedure. That is, the terminal device may transmit an Msg3 message to the network device, where the beam correspondence information is carried in the Msg3 to inform the network device of the beam correspondence information of the terminal device.

In the foregoing embodiment, the terminal device may report the beam correspondence information of the terminal device using the Msg1 message and/or the Msg3 message in the random access procedure. That is, the terminal device may transmit the beam correspondence information through the Msg1, or may transmit the beam correspondence information through the Msg3, or may also transmit the beam correspondence information through both of the Msg1 and the Msg3.

As an embodiment, the S220 may further include:

The terminal device transmits a radio resource control (RRC) signaling to the network device, where the RRC signaling includes the beam correspondence information.

Specifically, after the terminal device succeeds in random access, the terminal device may transmit a radio resource control (RRC) signaling to the network device, where the beam correspondence information can be carried in the RRC signaling to inform the network device of beam correspondence of the terminal device. In an embodiment, the RRC signaling may further include at least one of information of the uplink transmitting beam or information of an uplink transmitting beam group of the terminal device, where the information of the uplink transmitting beam includes a number of the uplink transmitting beam, and the information of the uplink transmitting beam group includes at least one of a number of the uplink transmitting beam group, a number of uplink transmitting beam included in each uplink transmitting beam group in the uplink transmitting beam group or a total number of uplink transmitting beams included in the uplink transmitting beam group.

In an embodiment, the terminal device may transmit the beam correspondence information via an Msg1 and/or an Msg3, or may also transmit the beam correspondence information by using an Msg1 and/or an Msg3 and an RRC signaling in a random access procedure. That is, the beam correspondence information may be transmitted via the Msg1 and the RRC signaling, or the beam correspondence information may be transmitted via the Msg3 and RRC signaling, or the beam correspondence information may be transmitted via the Msg1 message, the Msg3 message, and the RRC signaling.

As an embodiment, the beam correspondence information is carried in RRC signaling that is used to report capability information of the terminal device.

Specifically, the terminal device may report the capability information of the terminal device to the network device via the RRC signaling, and the RRC signaling that is used to report the capability information of the terminal device may further include beam correspondence information, that is, the network device can be informed about the capability information of the terminal device and the beam correspondence information of the terminal device via the same RRC signaling. Specifically, the capability information and the beam correspondence information of the terminal device may be carried in different indication domains of the RRC signaling. For example, the RRC signaling may include a capability information indication domain and a beam correspondence information indication domain, where the capability information indication domain is used to indicate capability information of the terminal device, and the beam correspondence information indication domain is used to indicate beam correspondence information of the terminal device.

In an embodiment, the terminal device transmits the beam correspondence information to the network device, includes:

The terminal device transmits a media access control (MAC) control element (CE) to the network device, where the MAC CE includes the beam correspondence information.

Specifically, after the terminal device succeeds in random access, the terminal device may transmit a media access control (MAC) control element (CE) to the network device, where the beam correspondence information is included in the MAC CE to inform the network device of the beam correspondence of the terminal device.

In an embodiment, the MAC CE may further include at least one of information of the uplink transmitting beam or information of an uplink transmitting beam group of the terminal device, where the information of the uplink transmitting beam includes a number of the uplink transmitting beam, and the information of the uplink transmitting beam group includes at least one of a number of the uplink transmitting beam group, a number of uplink transmitting beam included in each uplink transmitting beam group in the uplink transmitting beam group or a total number of uplink transmitting beams included in the uplink transmitting beam group.

In an embodiment, the terminal device may transmit the beam correspondence information via at least one of an Msg1, an Msg3, an RRC signaling, or a MAC CE. For example, the terminal device may transmit the beam correspondence via the Msg1 and the Msg3, or the beam correspondence information may be transmitted via the Msg1 and the RRC signaling, or the beam correspondence information may be transmitted via the Msg3 and RRC signaling, or the beam correspondence information may be transmitted through the Msg1 message, the MAC CE, and the RRC signaling, or the beam correspondence information may be transmitted via the Msg1, the Msg3, the RRC signaling, and the MAC CE.

Therefore, according to the communication method of the embodiment of the present disclosure, the terminal device can determine beam correspondence information at the terminal device, and then transmit the beam correspondence information to the network device, so that the network device can configure only one training beam in a link direction when the beam correspondence at the terminal device holds, thereby alleviating the burden on the device.

The communication method according to an embodiment of the present disclosure is described in detail from the perspective of a terminal device in conjunction with FIG. 2. Hereinafter, a communication method according to an embodiment of the present disclosure will be described in detail from the perspective of a network device in conjunction with FIG. 3. It should be understood that the description on the network device side and the description on the terminal device side correspond to each other. Similar description can be referred to the above. Details are not described herein again to avoid repetitions.

Figure 3:
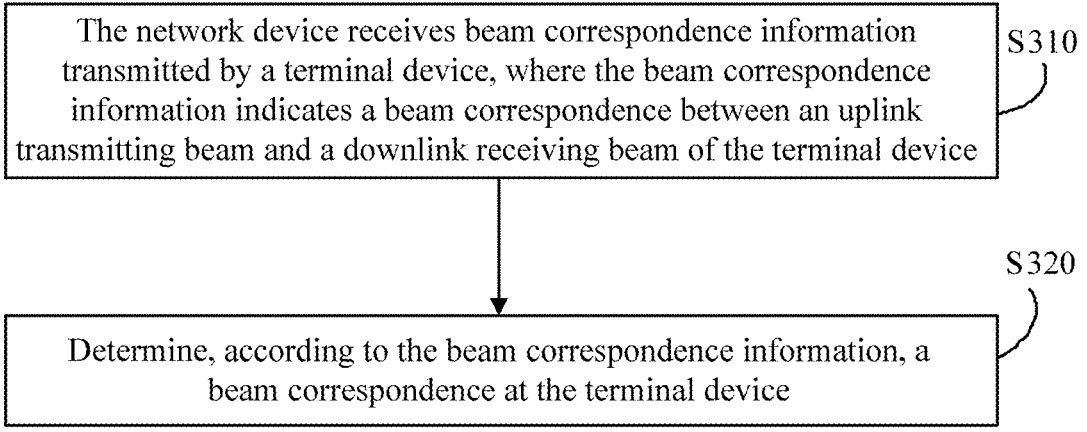
FIG. 3 is a schematic flowchart of a communication method according to an embodiment of the present disclosure.

FIG. 3 is a communication method according to an embodiment of the present disclosure, which is described from the perspective of a network device. As shown in FIG. 3, the method 300 includes:

S310, the network device receives beam correspondence information transmitted by a terminal device, where the beam correspondence information indicates a beam correspondence between an uplink transmitting beam and a downlink receiving beam of the terminal device;

S320, determine, according to the beam correspondence information, a beam correspondence at the terminal device.

In an embodiment, the beam correspondence is one of a plurality of beam correspondence, and the plurality of beam correspondence include that beam correspondence holds and beam correspondence does not hold.

Specifically, the terminal device may include multiple beam correspondence, where the beam correspondence information may indicate a specific beam correspondence between an uplink transmitting beam and a downlink receiving beam of the terminal device. The multiple beam correspondence may include two types of beam correspondence, and the two types of beam correspondence may be that the uplink transmitting beam and the downlink receiving beam of the terminal device have a corresponding relationship or have no corresponding relationship. If the uplink transmitting beam and the downlink receiving beam of the terminal device have a corresponding relationship, it can be considered that the beam correspondence at the terminal device holds; otherwise, the beam correspondence at the terminal device does not hold. The network device may receive the beam correspondence information transmitted by the terminal device, where the beam correspondence information indicates a beam correspondence at the terminal device, and the beam correspondence is one of a plurality of beam correspondence. The beam correspondence information may indicate that the beam correspondence at the terminal device holds or the beam correspondence at the terminal device does not hold. The network device can determine whether the beam correspondence at the terminal device holds according to the beam correspondence information. When the beam correspondence holds, the network device can configure only one training beam in the link direction for the terminal device, thereby alleviating the burden on the device.

As an embodiment, the network device receives the beam correspondence information transmitted by the terminal device, includes:

the network device receives a first message transmitted by the terminal device, where the first message includes the beam correspondence information, and the first message is a message in which the terminal device transmits a random access preamble signal to the network device in a random access procedure.

Specifically, the network device may receive the first message transmitted by the terminal device, where the first message includes the beam correspondence information, and the first message is a message in which the terminal device transmits a random access preamble signal to the network device in a random access procedure. In other words, the first message may be an Msg1 in a random access procedure. That is to say, the terminal device may transmit an Msg1 to the network device, where the beam correspondence information is carried in the Msg1, and inform the network device of the beam correspondence information of the terminal device via the Msg1.

In an embodiment, the method 300 further includes:

The network device transmits a plurality of configuration information to the terminal, where the plurality of configuration information correspond to configuration information that is used by the terminal device to transmit a random access signal in the plurality of beam correspondence respectively, where each configuration information includes at least one of the following:

information of a time domain resource for random access, information of a frequency domain resource for random access, or information of a preamble sequence for random access.

In this case, the S310 may further include:

The network device receives the random access signal that is transmitted by the terminal device by using configuration information corresponding to the beam correspondence.

In this case, the S320 may further include:

The network device determines a corresponding beam correspondence according to configuration information used by the received random access signal.

Specifically, the network device may transmit a plurality of configuration information to the terminal device, where each of the plurality of configuration information may indicate at least one of information of a time domain resource for random access, information of a frequency domain resource for random access, or information of a preamble sequence for random access. The plurality of configuration information correspond to configuration information that is used by the terminal device to transmit a random access signal in the plurality of beam correspondence respectively. That is, the terminal device can use at least one of a time domain resource, a frequency domain resource or a preamble sequence included in a corresponding configuration message to transmit a random access signal in different beam correspondence. Therefore, the network device may further determine, according to at least one of a time domain resource, a frequency domain resource, or the preamble sequence used by the terminal device to transmit the random access signal, which configuration information of the plurality of configuration information is used by the terminal device, and then determine a corresponding beam correspondence according to the configuration information that is used. That is, the network device can determine the beam correspondence of the terminal device according to a resource that the terminal device uses to transmit the random access signal.

In an embodiment, the plurality of configuration information includes first configuration information and second configuration information, where the first configuration information and the second configuration information correspond to configuration information that is used by the terminal device to transmit the random access signal in a beam correspondence that beam correspondence holds and a beam correspondence that beam correspondence does not hold respectively, where determining, according to the beam correspondence information, a beam correspondence at the terminal device, includes:

the network device determines that the beam correspondence at the terminal device holds if the network device receives the random access signal that is transmitted by the terminal device using at least one of information of a time domain resource for random access, information of a frequency domain resource for random access or information of a preamble sequence for random access included in the first configuration information; or the network device determines that the beam correspondence at the terminal device does not hold if the network device receives the random access signal that is transmitted by the terminal device using at least one of information of a time domain resource for random access, information of a frequency domain resource for random access or information of a preamble sequence for random access included in the second configuration information.

Specifically, the plurality of configuration information may include the first configuration information and the second configuration information. The first configuration information and the second configuration information correspond to configuration information that is used by the terminal device to transmit the random access signal in a beam correspondence that beam correspondence holds and a beam correspondence that beam correspondence does not hold respectively, that is, the first configuration information and the second configuration information indicate a resource used by the terminal device to transmit the random access signal in two beam correspondence respectively. Specifically, if the beam correspondence information indicates that the beam correspondence at the terminal device holds, the terminal device transmits a random access signal using the first configuration information corresponding to the case where the beam correspondence holds; or if the beam correspondence information indicates that the beam correspondence at the terminal device does not hold, the terminal device transmits a random access signal using the second configuration information corresponding to the case where the beam correspondence does not hold. Therefore, the network device may, according to the resource that the terminal device uses to transmit the random access signal, determine which configuration information is used by the terminal device among the plurality of configuration information, and thus determine a corresponding beam correspondence. That is, the network device may determine the beam correspondence at the terminal device according to the beam correspondence information included in the first message, or determine the beam correspondence at the terminal device according to the resource used by the terminal device to transmit the random access signal.

As an embodiment, the network device receives the beam correspondence information transmitted by the terminal device, includes:

the network device receives a second message transmitted by the terminal device, where the second message includes the beam correspondence information, and the second message is a message in which the terminal device transmits a terminal device identifier to the network device in a random access procedure.

Specifically, the network device may receive the second message transmitted by the terminal device, where the second message includes the beam correspondence information, and the second message is a message in which the terminal device transmits a terminal device identifier to the network device in a random access procedure. In other words, the second message may be an Msg3 in a random access procedure. That is, the terminal device may transmit an Msg3 message to the network device, where the beam correspondence information is carried in the Msg3 to inform the network device of the beam correspondence information of the terminal device.

As an embodiment, the network device receives the beam correspondence information transmitted by the terminal device, includes:

the network device receives a radio resource control (RRC) signaling transmitted by the terminal device, where the RRC signaling includes the beam correspondence information.

As an embodiment, the beam correspondence information is carried in an RRC signaling that is used to report capability information of the terminal device.

As an embodiment, the network device receives the beam correspondence information transmitted by the terminal device, includes:

the network device receives a media access control (MAC) control element (CE) transmitted by the terminal device, where the MAC CE includes the beam correspondence information.

As an embodiment, the RRC signaling or the MAC CE further includes at least one of information of the uplink transmitting beam or information of an uplink transmitting beam group of the terminal device.

As an embodiment, the information of the uplink transmitting beam includes a number of the uplink transmitting beam, and the information of the uplink transmitting beam group includes at least one of a number of the uplink transmitting beam group, a number of uplink transmitting beam included in each uplink transmitting beam group in the uplink transmitting beam group or a total number of uplink transmitting beams included in the uplink transmitting beam group.

Therefore, according to the communication method of the embodiment of the present disclosure, the network device can receive the beam correspondence information transmitted by the terminal device, and determine the beam correspondence of the terminal device according to the beam correspondence information, such that the network device can configure only one training beam in a link direction when the beam correspondence at the terminal device holds, thereby alleviating the burden on the device Communication methods according to the embodiment of the present disclosure have been described above in detail with reference to FIG. 2 to FIG. 3. A communication device according to the embodiment of the present disclosure will be described below with reference to FIG. 4 to FIG. 7, where technical features described in the method embodiments are also applied to the following device embodiments.

Figure 4:
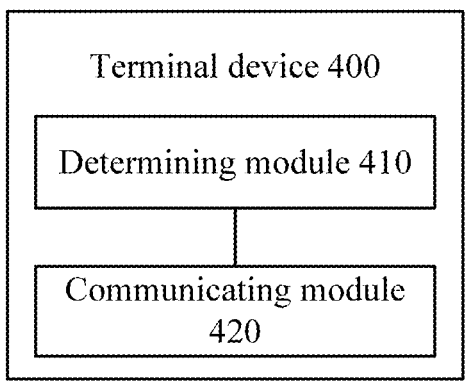
FIG. 4 is a schematic block diagram of a terminal device according to an embodiment of the present disclosure.

FIG. 4 shows a schematic block diagram of a terminal device 400 according to an embodiment of the present disclosure. As shown in FIG. 4, the terminal device 400 includes:

a determining module 410, configured to determine beam correspondence information, where the beam correspondence information indicates a beam correspondence between an uplink transmitting beam and a downlink receiving beam of the terminal device; and a communicating module 420, configured to transmit the beam correspondence information to a network device.

As an embodiment, the beam correspondence is one of a plurality of beam correspondence, and the plurality of beam correspondence include that beam correspondence holds and beam correspondence does not hold.

As an embodiment, the communicating module 420 is specifically configured to:

transmit a first message to the network device, where the first message includes the beam correspondence information, and the first message is a message in which the terminal device transmits a random access preamble signal to the network device in a random access procedure.

As an embodiment, the communicating module 420 is further configured to:

receive a plurality of configuration information transmitted by the network device, where the plurality of configuration information corresponds to configuration information that is used by the terminal device to transmit a random access signal in the plurality of beam correspondence respectively, where each configuration information includes at least one of the following:

information of a time domain resource for random access, information of a frequency domain resource for random access, or information of a preamble sequence for random access.

The communicating module 420 is further configured to:
transmit a random access signal by using configuration information corresponding to the beam correspondence.

In an embodiment, the plurality of configuration information includes first configuration information and second configuration information, where the first configuration information and the second configuration information correspond to configuration information that is used by the terminal device to transmit the random access signal in a beam correspondence that beam correspondence holds and a beam correspondence that beam correspondence does not hold respectively, where the communicating module is specifically configured to:

transmit the random access signal using at least one of information of a time domain resource for random access, information of a frequency domain resource for random access, or information of a preamble sequence for random access included in the first configuration information if the beam correspondence information indicates that beam correspondence at the terminal device holds; or transmit the random access signal using at least one of information of a time domain resource for random access, information of a frequency domain resource for random access, or information of a preamble sequence for random access included in the second configuration information if the beam correspondence information indicates that beam correspondence at the terminal device does not hold.

As an embodiment, the communicating module 420 is specifically configured to:

transmit a second message to the network device, where the second message includes the beam correspondence information, and the second message is a message in which the terminal device transmits a terminal device identifier to the network device in a random access procedure.

As an embodiment, the communicating module 420 is specifically configured to:

transmit a radio resource control (RRC) signaling to the network device, where the RRC signaling includes the beam correspondence information.

In an embodiment, the beam correspondence information is included in an RRC signaling that is used to report capability information of the terminal device.

As an embodiment, the communicating module 420 is specifically configured to:

transmit a media access control (MAC) control element (CE) to the network device, where the MAC CE includes the beam correspondence information.

As an embodiment, the RRC signaling or the MAC CE further includes at least one of information of the uplink transmitting beam or information of an uplink transmitting beam group of the terminal device.

As an embodiment, the information of the uplink transmitting beam includes a number of the uplink transmitting beam, and the information of the uplink transmitting beam group includes at least one of a number of the uplink transmitting beam group, a number of uplink transmitting beam included in each uplink transmitting beam group in the uplink transmitting beam group or a total number of uplink transmitting beams included in the uplink transmitting beam group.

In an embodiment, the determining module 410 is specifically configured to:

determine that the beam correspondence information indicates that beam correspondence at the terminal device holds if at least one of the following conditions is satisfied:

the terminal device is capable of determining an uplink transmitting beam for uplink transmission based on a measurement by the terminal device on at least one downlink receiving beam; or the terminal device is capable of determining the downlink receiving beam for downlink transmission based on an indication from the network device, where the indication from the network device is obtained through a measurement by the network device on at least one uplink transmitting beam of the terminal device.

It should be understood that the terminal device 400 according to the embodiment of the present disclosure may correspond to the terminal device in the method embodiment of the present disclosure, where the above mentioned and other operations and/or functions of respective units in the terminal device 400 implement a corresponding process of the terminal device in the method 200 shown in FIG. 2 respectively, which are not repeated for the sake of brevity.

Figure 5:
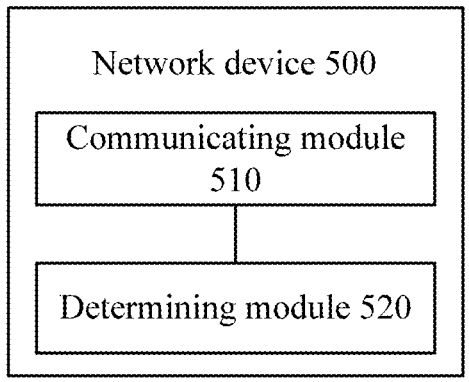
FIG. 5 is a schematic block diagram of a network device according to an embodiment of the present disclosure.

FIG. 5 shows a schematic block diagram of a network device 500 according to an embodiment of the present disclosure. As shown in FIG. 5, the network device 500 includes:

a communicating module 510, configured to receive beam correspondence information transmitted by a terminal device, where the beam correspondence information indicates a beam correspondence between an uplink transmitting beam and a downlink receiving beam of the terminal device; and a determining module 520, configured to determine, according to the beam correspondence information, a beam correspondence at the terminal device.

As an embodiment, the beam correspondence is one of a plurality of beam correspondence, and the plurality of beam correspondence include that beam correspondence holds and beam correspondence does not hold.

As an embodiment, the communicating module 510 is specifically configured to:

receive a first message transmitted by the terminal device, where the first message includes the beam correspondence information, where the first message includes the beam correspondence information, and the first message is a message in which the terminal device transmits a random access preamble signal to the network device in a random access procedure.

As an embodiment, the communicating module 510 is further configured to:

transmit a plurality of configuration information to the terminal, where the plurality of configuration information corresponds to configuration information that is used by the terminal device to transmit a random access signal in the plurality of beam correspondence respectively, where each configuration information includes at least one of the following:

information of a time domain resource for random access, information of a frequency domain resource for random access, or information of a preamble sequence for random access.

The communicating module 510 is further configured to:

receive a random access signal that is transmitted by the terminal device by using configuration information corresponding to the beam correspondence.

In an embodiment, the plurality of beam correspondence include a situation that the beam correspondence at the terminal device holds and a situation that the beam correspondence at the terminal device does not hold, the plurality of configuration information includes first configuration information and second configuration information, where the first configuration information and the second configuration information correspond to configuration information that is used by the terminal device to transmit the random access signal in a beam correspondence that beam correspondence holds and a beam correspondence that beam correspondence does not hold respectively, where the determining module 520 is specifically configured to:

determine that the beam correspondence at the terminal device holds if the network device receives the random access signal that is transmitted by the terminal device using at least one of information of a time domain resource for random access, information of a frequency domain resource for random access or information of a preamble sequence for random access included in the first configuration information; or determine that the beam correspondence at the terminal device does not hold if the network device receives the random access signal that is transmitted by the terminal device using at least one of information of a time domain resource for random access, information of a frequency domain resource for random access or information of a preamble sequence for random access included in the second configuration information.

As an embodiment, the communicating module 510 is specifically configured to:

receive a second message transmitted by the terminal device, where the second message includes the beam correspondence information, and the second message is a message in which the terminal device transmits a terminal device identifier to the network device in a random access procedure.

As an embodiment, the communicating module 510 is specifically configured to:

receive a radio resource control (RRC) signaling transmitted by the terminal device, where the RRC signaling includes the beam correspondence information.

In an embodiment, the beam correspondence information is carried in an RRC signaling that is used to report capability information of the terminal device.

As an embodiment, the communicating module 510 is specifically configured to:

receive a media access control (MAC) control element (CE) transmitted by the terminal device, where the MAC CE includes the beam correspondence information.

In an embodiment, the RRC signaling or the MAC CE further includes at least one of information of the uplink transmitting beam or information of an uplink transmitting beam group of the terminal device.

In an embodiment, the information of the uplink transmitting beam includes a number of the uplink transmitting beam, and the information of the uplink transmitting beam group includes at least one of a number of the uplink transmitting beam group, a number of uplink transmitting beam included in each uplink transmitting beam group in the uplink transmitting beam group or a total number of uplink transmitting beams included in the uplink transmitting beam group.

It should be understood that the network device 500 according to the embodiment of the present disclosure may correspond to the network device in the method embodiment of the present disclosure, where the above operations and/or functions of respective units in the network device 500 implement a corresponding process of the network device in the method 300 shown in FIG. 3 respectively, which are not repeated for the sake of brevity.

Figure 6:
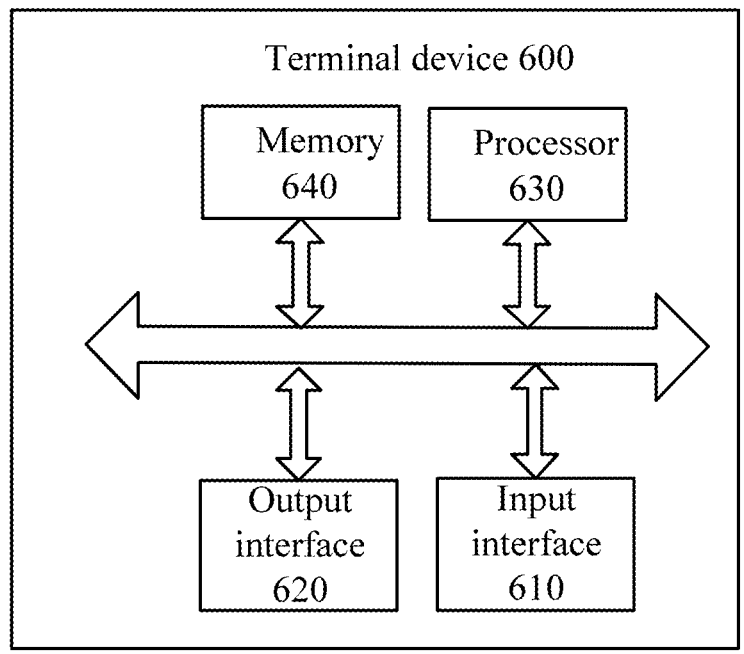
FIG. 6 is a schematic block diagram of a terminal device according to an embodiment of the present disclosure.

As shown in FIG. 6, the embodiment of the present disclosure further provides a terminal device 600, where the terminal device 600 may be the terminal device 400 in FIG. 4, which can be used to execute the content of the terminal device corresponding to the method 200 in FIG. 2. The terminal device 600 includes an input interface 610, an output interface 620, a processor 630, and a memory 640, where the input interface 610, the output interface 620, the processor 630, and the memory 640 can be connected through a bus system. The memory 640 is used to store programs, instructions or codes. The processor 630 is configured to execute the program, the instructions or the codes stored in the memory 640 to control the input interface 610 to receive a signal, control the output interface 620 to transmit a signal, and complete the operations in the above mentioned method embodiments.

It should be understood that, in the embodiment of the present disclosure, the processor 630 may be a central processing unit (CPU), and the processor 630 may also be another general purpose processor, a digital signal processors (DSP), an application specific integrated circuit (ASIC), a field programmable gate array (FPGA) or other programmable logic device, a discrete gate or transistor logic device, discrete hardware component, and the like. The general purpose processor may be a microprocessor or any conventional processor or the like.

The memory 640 may include read only memory and random access memory and provides instructions and data to the processor 630. A portion of the memory 640 may also include a non-volatile random access memory. For example, the memory 640 may also store information of a device type.

In an implementation process, each content of the above mentioned method may be implemented by an integrated logic circuit of hardware or instructions in a form of software in the processor 630. The content of the method disclosed in the embodiments of the present disclosure may be directly implemented as a hardware processor, or may be performed by a combination of hardware and software modules in the processor. The software module can be located in a conventional storage medium such as a random access memory, a flash memory, a read-only memory, a programmable read-only memory or an electrically erasable programmable memory, a register, and the like. The storage medium is located in the memory 640. The processor 630 reads information in the memory 640 and implements the contents of the above method together with its hardware. To avoid repetition, it will not be described in detail herein.

In a specific implementation, the determining module 410 in FIG. 4 may be implemented by the processor 630 of FIG. 6, and the communicating module 420 can be implemented by the input interface 610 and the output interface 620 of FIG. 6.

Figure 7:
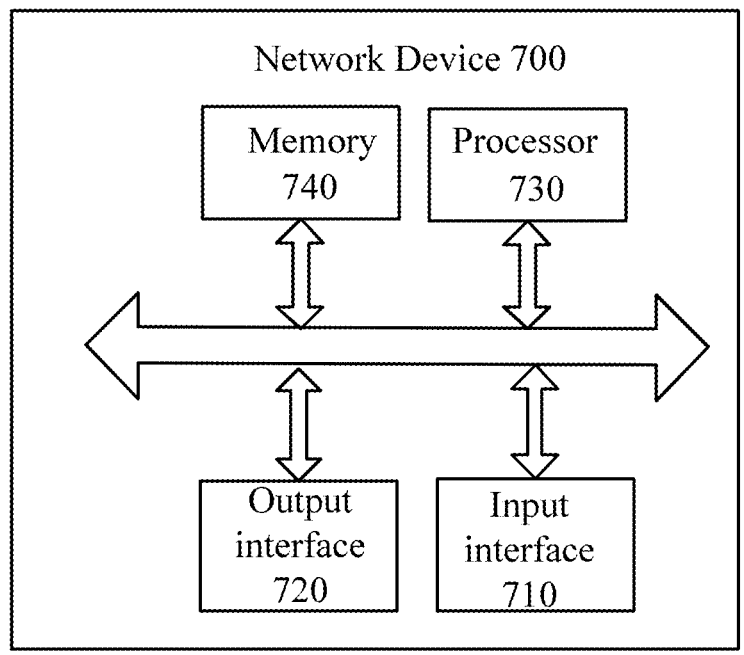
FIG. 7 is a schematic block diagram of a network device according to an embodiment of the present disclosure.

As shown in FIG. 7, the embodiment of the present disclosure further provides a network device 700, where the network device 700 may be the network device 500 in FIG. 5, which can be used to execute the content of the terminal device corresponding to the method 300 in FIG. 3. The network device 700 includes an input interface 710, an output interface 720, a processor 730, and a memory 740, where the input interface 710, the output interface 720, the processor 730, and the memory 740 can be connected through a bus system. The memory 740 is used to store programs, instructions or codes. The processor 730 is configured to execute the program, the instructions or the codes stored in the memory 740 to control the input interface 610 to receive a signal, control the output interface 720 to transmit a signal, and complete the operations in the above mentioned method embodiments.

It should be understood that, in the embodiment of the present disclosure, the processor 730 may be a central processing unit (CPU), and the processor 730 may also be another general purpose processor, a digital signal processors (DSP), an application specific integrated circuit (ASIC), a field programmable gate array (FPGA) or other programmable logic device, a discrete gate or transistor logic device, discrete hardware component, and the like. The general-purpose processor may be a microprocessor or any conventional processor or the like.

The memory 740 may include read only memory and random access memory and provides instructions and data to the processor 730. A portion of the memory 740 may also include a non-volatile random access memory. For example, the memory 740 may also store information of a device type.

In an implementation process, each content of the above-mentioned method may be implemented by an integrated logic circuit of hardware or instructions in a form of software in the processor 730. The content of the method disclosed in the embodiments of the present disclosure may be directly implemented as a hardware processor, or may be performed by a combination of hardware and software modules in the processor. The software module can be located in a conventional storage medium such as a random access memory, a flash memory, a read-only memory, a programmable read-only memory or an electrically erasable programmable memory, a register, and the like. The storage medium is located in the memory 740. The processor 730 reads information in the memory 740 and implements the contents of the above method together with its hardware. To avoid repetition, it will not be described in detail herein.

In a specific implementation, the communicating module 510 in FIG. 5 may be implemented by the input interface 710 and the output interface 720 of FIG. 7, and the determining module 520 can be implemented by the processor 730 of FIG. 7.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraints of the technical scheme. Professionals can use different methods for each specific application to implement the described functionality, but this kind of implementation should not be considered beyond the scope of the present disclosure.

A person skilled in the art can clearly understand that for the convenience and brevity of the description, specific working processes of a system, a device and a unit described above can refer to the corresponding processes in the foregoing method embodiments, and details are not described herein again.

In the several embodiments provided by the present disclosure, it should be understood that the disclosed system, device, and method may be implemented in other manners. For example, the device embodiments described above are merely illustrative. For example, the division of the unit is only a logical function division, in actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interfaces, devices or units, and may be electrical, mechanical or otherwise.

The units described as separate components may or may not be physically separated, and the components displayed as units may or may not be physical units, that is, may be located in one site, or may be distributed to multiple network units. Some or all of the units may be selected according to actual needs to achieve the purpose of the solution of the embodiments.

Furthermore, each functional unit in the embodiments of the present disclosure may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present disclosure, in nature, or which makes contributions to the prior art, or a part of the technical solution, may be embodied in the form of a software product, which is stored in a storage medium, where a plurality of instructions are included to cause a computer device (which may be a personal computer, a server, or a network device, etc.) to perform all or part of the steps of the method described in the embodiments of the present disclosure. The foregoing storage medium includes: a USB flash disk, a mobile hard disk, a read-only memory (ROM), a random access memory (RAM), a magnetic disk, or an optical disk, and the like which can store program codes.

The foregoing description is only specific embodiments of the present disclosure; however, the scope of protection of the present disclosure is not limited thereto, and changes or substitutions that can be readily think of by any person skilled in the art within the technical scope disclosed in the present disclosure shall be covered by the scope of protection of the present disclosure. Therefore, the scope of protection of the present disclosure shall be subject to the scope of protection of the claims.

What is claimed is:

1. A communication method, comprising:
   determining, by a terminal device, beam correspondence information, wherein the beam correspondence information indicates a beam correspondence between an uplink transmitting beam and a downlink receiving beam of the terminal device; and
   transmitting, by the terminal device, a radio resource control (RRC) signaling to a network device before beam training so that in a case that the beam correspondence of the terminal device holds, the network device configures only one training beam in a link direction, wherein the RRC signaling comprises the beam correspondence information and capability information of the terminal device, the beam correspondence information and the capability information of the terminal device are carried in different indication domains of the RRC signaling, and the capability information of the terminal device comprises information of uplink transmitting beam groups of the terminal device, wherein the information of the uplink transmitting beam groups comprises a number of the uplink transmitting beam groups and a number of uplink transmitting beams comprised in each of the uplink transmitting beam groups.

2. The communication method according to claim 1, wherein the beam correspondence is one of a plurality of beam correspondence, and the plurality of beam correspondence comprise that beam correspondence holds and beam correspondence does not hold.

3. The communication method according to claim 1, wherein the determining, by a terminal device, beam correspondence information comprises:
   determining, by the terminal device, that the beam correspondence information indicates that beam correspondence at the terminal device holds in a case that at least one of the following conditions is satisfied:
   the terminal device is capable of determining the uplink transmitting beam for uplink transmission based on a measurement by the terminal device on at least one downlink receiving beam; or
   the terminal device is capable of determining the downlink receiving beam for downlink transmission based on an indication from the network device, wherein the indication from the network device is obtained through a measurement by the network device on at least one uplink transmitting beam of the terminal device.

4. A communication method, comprising:
   receiving, by a network device, a radio resource control (RRC) signaling transmitted by a terminal device before beam training so that in a case that the beam correspondence of the terminal device holds, the network device configures only one training beam in a link direction, wherein the RRC signaling comprises beam correspondence information and capability information of the terminal device, the beam correspondence information and the capability information of the terminal device are carried in different indication domains of the RRC signaling, and the capability information of the terminal device comprises information of uplink transmitting beam groups of the terminal device, wherein the beam correspondence information indicates a beam correspondence between an uplink transmitting beam and a downlink receiving beam of the terminal device, and the information of the uplink transmitting beam groups comprises a number of the uplink transmitting beam groups and a number of uplink transmitting beams comprised in each of the uplink transmitting beam groups; and
   determining, according to the beam correspondence information, a beam correspondence at the terminal device.

5. A terminal device, comprising a memory, a processor, an input interface and an output interface, wherein:
   the memory has executable instructions stored thereon that when executed by the processor cause the processor to:
   determine beam correspondence information, wherein the beam correspondence information indicates a beam correspondence between an uplink transmitting beam and a downlink receiving beam of the terminal device; and
   the memory further has executable instructions stored thereon that when executed by the processor cause the output interface to:
   transmit a radio resource control (RRC) signaling to a network device before beam training so that in a case that the beam correspondence of the terminal device holds, the network device configures only one training beam in a link direction, wherein the RRC signaling comprises the beam correspondence information and capability information of the terminal device, the beam correspondence information and the capability information of the terminal device are carried in different indication domains of the RRC signaling, and the capability information of the terminal device comprises information of uplink transmitting beam groups of the terminal device, wherein the information of the uplink transmitting beam groups comprises a number of the uplink transmitting beam groups and a number of uplink transmitting beams comprised in each of the uplink transmitting beam groups.

6. The terminal device according to claim 5, wherein the beam correspondence is one of a plurality of beam correspondence, and the plurality of beam correspondence comprise that beam correspondence holds and beam correspondence does not hold.

7. The terminal device according to claim 5, wherein the memory further has executable instructions stored thereon that when executed by the processor cause the output interface to:
- transmit a first message to the network device, wherein the first message comprises the beam correspondence information, and the first message is a message in which the terminal device transmits a random access preamble signal to the network device in a random access procedure.

8. The terminal device according to claim 5, wherein the memory further has executable instructions stored thereon that when executed by the processor cause the input interface to:
- receive a plurality of configuration information transmitted by the network device; and
- the memory further has executable instructions stored thereon that when executed by the processor cause the output interface to:
- transmit a random access signal by using configuration information corresponding to the beam correspondence; and
- wherein the plurality of configuration information correspond to configuration information that is used by the terminal device to transmit the random access signal in the plurality of beam correspondence, wherein each configuration information comprises at least one of the following:
- information of a time domain resource for random access, information of a frequency domain resource for random access, or information of a preamble sequence for random access.

9. The terminal device according to claim 8, wherein the plurality of configuration information comprise first configuration information and second configuration information, wherein the first configuration information and the second configuration information correspond to configuration information that is used by the terminal device to transmit the random access signal in a beam correspondence that beam correspondence holds and a beam correspondence that beam correspondence does not hold respectively, wherein the memory further has executable instructions stored thereon that when executed by the processor cause the output interface to:
- transmit the random access signal using at least one of information of a time domain resource for random access, information of a frequency domain resource for random access, or information of a preamble sequence for random access comprised in the first configuration information in a case that the beam correspondence information indicates that beam correspondence at the terminal device holds; or
- transmit the random access signal using at least one of information of a time domain resource for random access, information of a frequency domain resource for random access, or information of a preamble sequence for random access comprised in the second configuration information in a case that the beam correspondence information indicates that beam correspondence at the terminal device does not hold.

10. The terminal device according to claim 5, wherein the memory further has executable instructions stored thereon that when executed by the processor cause the processor to:
- determine that the beam correspondence information indicates that beam correspondence at the terminal device holds in a case that at least one of the following conditions is satisfied:
- the terminal device is capable of determining an uplink transmitting beam for uplink transmission based on a measurement by the terminal device on at least one downlink receiving beam; or
- the terminal device is capable of determining the downlink receiving beam for downlink transmission based on an indication from the network device, wherein the indication from the network device is obtained through a measurement by the network device on at least one uplink transmitting beam of the terminal device.

11. The terminal device according to claim 5, wherein the memory further has executable instructions stored thereon that when executed by the processor cause the output interface to:
- report the beam correspondence information to the network device based on an indication from the network device.

12. A network device, comprising a processor, a memory, an input interface, an output interface, wherein:
- the memory has executable instructions stored thereon that when executed by the processor cause the input interface to:
- receive a radio resource control (RRC) signaling transmitted by a terminal device before beam training so that in a case that the beam correspondence of the terminal device holds, the network device configures only one training beam in a link direction, wherein the RRC signaling comprises beam correspondence information and capability information of the terminal device, the beam correspondence information and the capability information of the terminal device are carried in different indication domains of the RRC signaling, and the capability information of the terminal device comprises information of uplink transmitting beam groups of the terminal device, wherein the beam correspondence information indicates a beam correspondence between an uplink transmitting beam and a downlink receiving beam of the terminal device, and the information of the uplink transmitting beam groups comprises a number of the uplink transmitting beam groups and a number of uplink transmitting beams comprised in each of the uplink transmitting beam groups; and
- the memory further has executable instructions stored thereon that when executed by the processor cause the processor to:
- determine, according to the beam correspondence information, a beam correspondence at the terminal device.

13. The network device according to claim 12, wherein the memory further has executable instructions stored thereon that when executed by the processor cause the input interface to:
- receive the beam correspondence information reported by the terminal device based on an indication from the network device.

* * * * *